United States Patent [19]
Keeler et al.

[11] 3,773,205
[45] Nov. 20, 1973

[54] THERMOFORMED CLOSURES WHICH ARE SEALED TO CONTAINERS BY THE USE OF SONIC ENERGY AND THE METHOD OF SEALING THE SAME

[75] Inventors: Frederick D. Keeler, Trumbull; Carleton Ellis, Jr., Southport; John C. Miller, Trumbull, all of Conn.

[73] Assignee: The KLM Company, Stratford, Conn.

[22] Filed: Mar. 4, 1971

[21] Appl. No.: 120,893

[52] U.S. Cl............ 215/42, 53/39, 156/73, 206/65 K, 215/43 R, 220/DIG. 31, 229/48 T
[51] Int. Cl............................................ B65d 41/20
[58] Field of Search............ 215/42, 43 R, 46 A, 215/37, 38 R, 7, 9, 1 C; 156/73; 229/43, 48 T; 220/53, DIG. 31; 206/DIG. 10; 53/39, 42

[56] References Cited
UNITED STATES PATENTS

| | | | |
|---|---|---|---|
| 3,549,440 | 12/1970 | Adcock et al. | 53/42 |
| 3,673,761 | 7/1972 | Leitz | 215/42 |
| 3,525,454 | 8/1970 | Frederiksen | 220/DIG. 31 |
| 3,243,070 | 3/1966 | Hoyle | 215/38 R |
| 3,544,338 | 12/1970 | Kinney | 215/1 C |
| 3,276,616 | 10/1966 | Lurie | 156/73 |
| 3,263,847 | 8/1966 | Amann | 220/27 |
| 3,483,066 | 12/1969 | Harris et al. | 220/DIG. 31 |
| 3,449,183 | 6/1969 | Zelnick | 220/DIG. 31 |
| 3,394,831 | 7/1968 | Bathish et al. | 215/42 |
| 3,317,068 | 5/1967 | Betner | 229/43 |
| 2,937,481 | 5/1960 | Palmer | 215/43 R |
| 3,585,096 | 6/1971 | Uhimchuk et al. | 156/73 |

*Primary Examiner*—George E. Lowrance
*Assistant Examiner*—Stephen Marcus
*Attorney*—Darby & Darby

[57] ABSTRACT

Closures thermoformed from a relatively thin sheet of plastic material are sealed to containers by the use of sonic energy to control the amount of torque needed to unfasten such closures and also to provide a "tamper-proof" seal.

16 Claims, 9 Drawing Figures

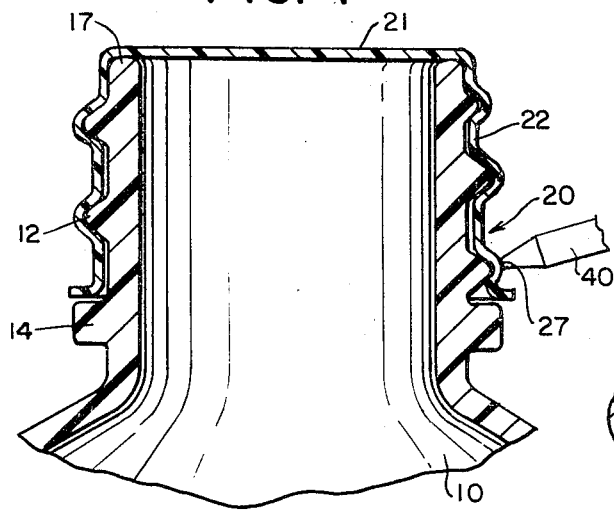
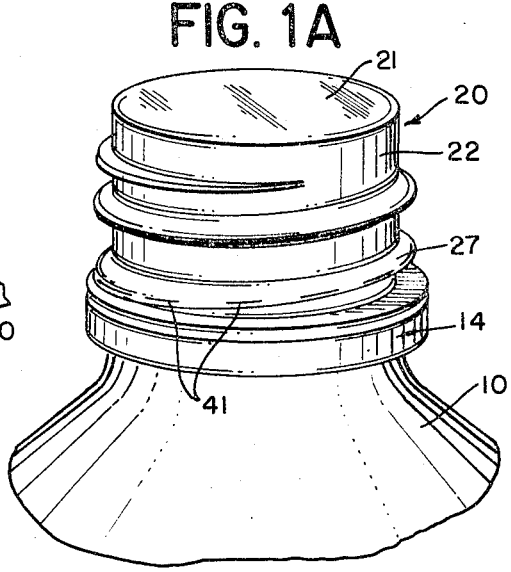
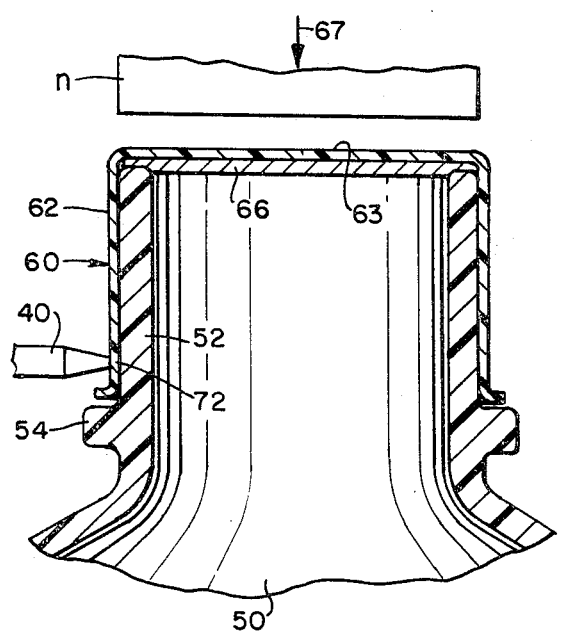
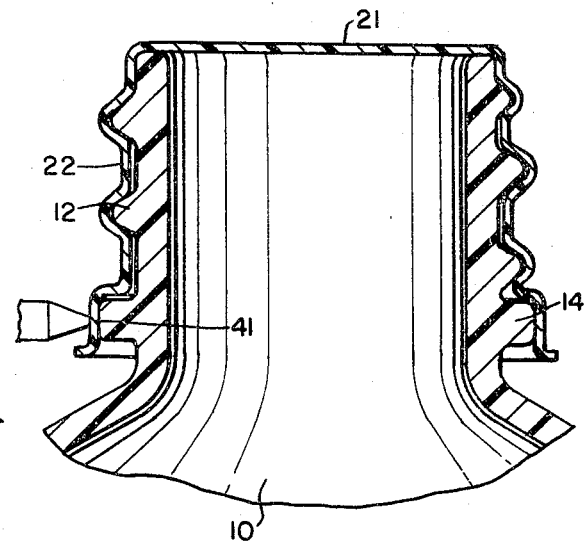
INVENTORS
FREDERICK D. KEELER
CARLETON ELLIS, JR.
JOHN C. MILLER
BY Darby & Darby
ATTORNEYS

INVENTORS
FREDERICK D. KEELER
CARLETON ELLIS, JR.
JOHN C. MILLER

BY Darby & Darby
ATTORNEYS

THERMOFORMED CLOSURES WHICH ARE SEALED TO CONTAINERS BY THE USE OF SONIC ENERGY AND THE METHOD OF SEALING THE SAME

This invention relates to fastening of closures to containers and more particularly to the fastening of a thermoformed closure to a container by the use of sonic energy.

Thermoformed closures are beginning to gain greater acceptance for use in sealing containers. One of the prime advantages of such closures is their relatively low cost since they are made by conventional vacuum or pressure-forming techniques from plastic sheet material. Several such thermoformed closures are disclosed in U.S. Pat. No. 3,482,725 issued Dec. 9, 1969 to Norman Exton and copending application Ser. No. 826,973, filed May 22, 1969, entitled "Closure", now U.S. Pat. No. 3,606,063, both of which were assigned to the assignee of the subject application.

The inventions of the aforesaid patent and patent application achieve the desired objectives of an economical thermoformed closure. In some cases it is desirable to use such closures in "tamper-proof" applications. That is, to use the closures in such a way that once the seal is broken, this will be visible. This prevents, for example, selling a container which has already been opened. A "tamper-proof" closure is also more difficult to open, thereby permitting its use in applications where children are to be discouraged from opening the container.

Tamper-proof closures have heretofore been made which use a band of a so-called heat-shrinkable film material. The band fits over a portion of the closure, which is of metal or injection molded plastic, and a portion of the container. The band of material is usually placed with a loose fit over the desired portions of the container and closure, and heat is applied. The band of material shrinks, forming a tight bond between the closure and the container. The film of heat shrinkable material must be broken for the closure to be taken off a container. Thus, the use of the heat-shrinkable material provides a "tamper-proof" feature for the closure since a visual inspection will show whether or not it has been broken.

The use of a band of heat shrinkable material also generally increases the force which must be used to remove the closure from the container. In addition, it prevents back-off of the closure from the container after the closure has been tightened. Such "back-off" can occur due to the relatively slippery interface between the closure and the container.

While heat-shrinkable seals are satisfactory for use with metal and relatively heavy injection molded plastic closure, they have several disadvantages. First, they are relatively expensive. Also, their use slows down the process of filling the containers since it takes a relatively long period of time to heat the heat-shrinkable material to a temperature where it will shrink. Further, the use of such heat shrinkable films, while it increases the force needed to break the seal, does not really permit a precise selection of the amount of force which will be required to unfasten the closure.

In addition to the foregoing disadvantages, heat-shrinkable films are not readily usable with thermoformed plastic closures of the type under consideration in the subject invention. One of the main reasons for this is that the heat applied can possibly deform and distort the closure to a point where its sealing efficacy is destroyed.

The subject invention is directed to a thermoformed closure of thermoplastic material for sealing a container. The closure is made from a sheet of plastic material, which is relatively thin. The container can either be of thermoplastic material or of some non-plastic material which thermoplastic material placed thereon at a predetermined location. In accordance with the invention, the closure is fastened down onto the container and is "welded" to the container by the use of sonic energy. By selecting the area of the sonic seal and the number of such seals, the amount of force needed to break the seals can be readily controlled. This has the advantage of minimizing the problem of applying a precise amount of sealing torque to the closures as they are fastened down on the containers, since the amount of force, or torque, required to unfasten the closure is now governed by the sonic seals. In addition, the subject invention provides a tamper-proof closure since once the seal, or seals, are broken, it is apparent visually.

It is therefore an object of the present invention to provide a novel combination of a thermoformed plastic closure which is sealed to a plastic portion of a container by sonic energy.

A further object is to provide a novel method for sealing plastic closures to containers.

An additional object is to provide novel forms of thermoformed plastic closures which lend themselves readily to sealing a container.

Other objects and advantages of the present invention will become more apparent upon reference to the following specification and annexed drawings, in which FIG. 1 is an elevational view in cross-section of a container and one form of closure in accordance with the subject invention;

FIG. 1A is a perspective view of the closure of FIG. 1;

FIG. 2 is a view similar to FIG. 1 showing another embodiment of the invention;

FIG. 3 is an elevational view showing still another embodiment of the invention.

Figure 4:
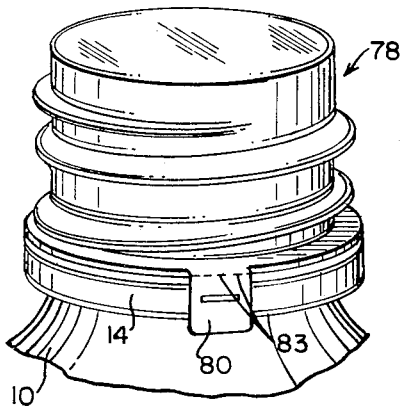
FIGS. 4–8 are perspective views of still further embodiments of the closure.

Referring to FIG. 1, a portion of the neck of a container 10 is shown. The container can be of any suitable thermoplastic material and made in any suitable way, for example, by a conventional blow molding technique. The neck of the container is formed with a conventional screw thread 12 which is located above a raised ring 14, commonly called a transfer ring. The latter is conventional in most plastic bottles and is used for manufacturing purposes.

Sealed over the open neck of the container 10 is a thermoformed closure 20. The closure can be, for example, as described in the aforesaid patent application and is thermoformed from a sheet of thermoplastic material of substantially uniform, and relatively thin, thickness. The closure 20 is formed with a top wall 21 from which depends a skirt wall 23 having screw threads 22, thereon which mate with the screw threads 12 on the container. The other details of this closure are fully set forth in the aforesaid copending application.

As seen most clearly in FIG. 1A, the closure is screwed down onto the container for a desired number of turns. For reasons which will become apparent from the description below, the closure is only tightened down an amount necessary to form a good seal at the top lip 17 of the container.

To seal the closure to the container, sonic energy from a transducer head 40 is applied, preferably at or near the lower edge 27 of the closure skirt wall at a point where the thread 12 of the container exists. The sonic energy head 40 can be of any suitable configuration which is conventional in the art. Such configurations include slightly horned shape. The head is brought into contact with the closure and the ultrasonic energy is applied. The ultrasonic energy, whose frequency is in the order of 20 Khz., sets up a frictional vibration at the interface of the closure and the container. This vibration produces heat which in turn melts the plastic at both the container and the closure interface to form a weld.

By selecting the area of the weld which can be done by shaping the transducer head 40, and/or the number of such welds spaced around a closure, the torque needed to open the container closure is readily controlled. The larger the total weld area, which is selected by making one or a few large welds or a number of smaller welds, the greater will be the force required to break the weld. For example, a number of relative welds can be placed around the lower edge of the container in somewhat of a stitch form, as is shown in FIG. 1. Alternately a few welds of larger area can be used. While it is possible, it is not normally contemplated to form a complete, continuous ring type sonic weld seal around the closure, since this would make the closure difficult, if not impossible, to remove manually from the container.

In the preferred form of the invention the thickness of the sheet from which the closure was formed, and thus the thickness of the skirt wall 23, is preferably not greater than 0.045 inches. Thicknesses greater than this are either too difficult and/or expensive to thermoform into closures and require a relatively long time of application of sonic energy to produce the weld.

FIG. 2 shows another embodiment of the invention. Here, a bottle 50 is provided with the usual neck 52 and transfer ring 54. In this case, the neck 52 of the bottle does not have any screw threads. Instead, it is made relatively smooth on the outside as would be used in a container which is to be sealed by a plug-type closure.

A closure 60 in this case is in the form of a cylinder having a skirt wall 62 and a top wall 63. The closure 60 can be made by a thermoforming technique which would include having a cylindrical mold into which, or over which, the sheet material is draped and then cut after it has been formed. A liner 66 is shown located adjacent the top wall 63. Liner 66 is generally placed into position after the closure has been formed. To seal the closure 60 of FIG. 2 to the container 50, it is only necessary to apply a suitable pressure to the top of the closure in the direction shown by the arrow 67. This can be done, for example, by using a small plate n or roller on the assembly line. At the same time that the pressure is applied, a sonic seal is made at one or more of the areas 72 by the ultrasonic transducer. After the seal is made, the force applying element is removed from the top of the closure. The closure 60 cannot back off the container since it is held in the same position at which the sonic energy was applied due to the weld or welds formed by the sonic-sealing. In the sealed position of the closure the liner 66 is compressed forming a tight seal at the lip of the container. Consequently, the container is sealed by a closure which has no thread.

In the embodiment shown in FIG. 2, the amount of force, or torque, required to remove the closure 60 from the container 50 is also determined by the number of sonic welds which are made around the neck of the container. Again, the size and number of these welds can be selected for this purpose.

FIG. 3 shows another embodiment of the invention for use with a screw-threaded cap. Here, the end of the skirt wall is extended downwardly from that shown in FIG. 2 to ride over the transfer ring 14 on the container. In this case, the sonic seal or seals 41 are made to the transfer ring rather than to the thread of the container as in FIG. 1.

In each of the embodiments shown in FIGS. 1–3, the closure is effectively tamper-proof since, once the seal is broken, it will be apparent by visual inspection.

FIG. 4 shows another embodiment of the invention which provides a better tamper-proof indication. Here, the closure 78 is also thermoformed and has a downwardly extending tab 80. The tab 80 overlies the transfer ring 14 and the sonic seal is made preferably on the tab at the area where the tab portion 80 lies over the transfer ring. When the closure 70 is unscrewed from the container, there will be a breaking away of the tab portion 80 from the remainder of the closure. To facilitate this, the tab 80 can be provided with score lines or weakened sections 83. The presence of the broken portion of tab 80 will indicate that the container previously as been opened.

It should be pointed out that the closure of FIG. 4 has a disadvantage in the fact that it requires orientation, or indexing, of the tab portion 80 with respect to the ultrasonic sealing gun. In the embodiments of the invention described previously, such indexing is not necessary.

Figure 5:
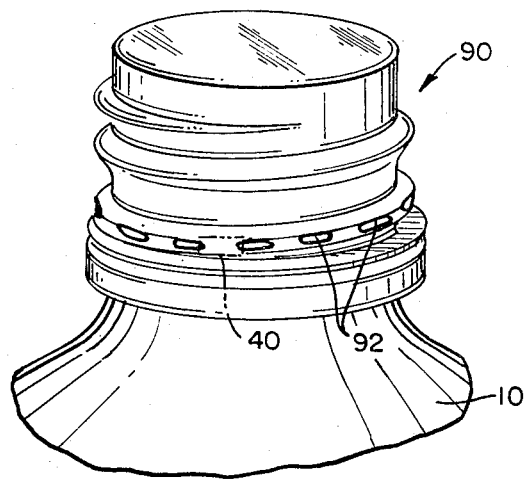

FIG. 5 shows another embodiment of the invention which provides a visual tamper-proof indication. Here, the closure 90 is thermoformed with a series of cutouts 92 spaced in a ring around the closure skirt wall. The length of each ring is less than the length of the transducer head 40 so that no matter what the orientation of the container with respect to the head 40, the head will still seal a portion of the skirt wall which is located between two adjacent cutouts 92. Here, when the closure 90 is unscrewed from the container, the lower portion of the closure, at or below the cutouts 92, will separate from the upper portion. The presence of the break at the lower portion usually indicates that the closure has been opened.

Figure 6:
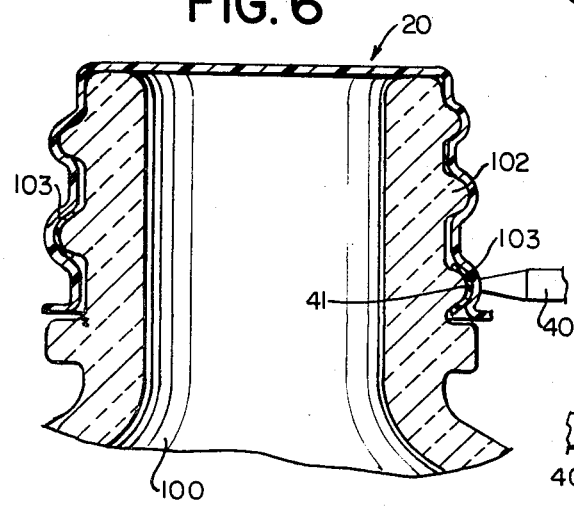

FIG. 6 shows the neck of a glass container 100 which, typically, has threads 102. A band 103 of thermoplastic material is coated over the thread 102 where the sonic seal 41 is to be made. Such thermoplastic material can be applied in molten form to the glass container, for example, by spraying or brushing. In operation, the closure 20 is fastened down in the same manner as FIG. 1 and the sonic energy is supplied. Here, however, the weld 41 can be formed only at the place where the container is coated with the thermoplastic material. This technique also can be used for unthreaded containers, such as shown in FIG. 2.

Figure 7:
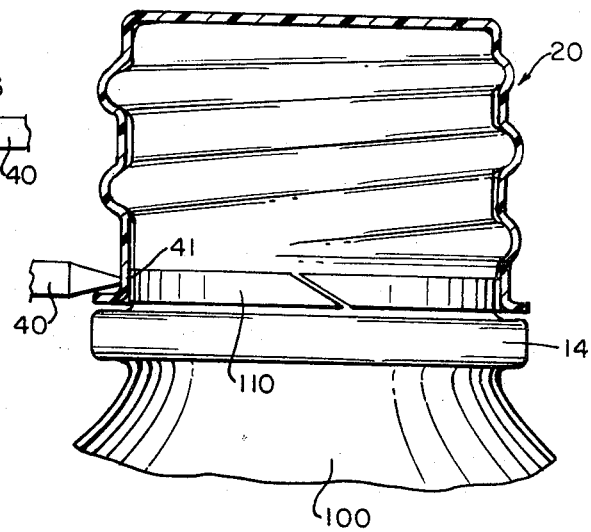

FIG. 7 still shows another embodiment of the invention wherein instead of coating the thermoplastic material onto the neck of a glass bottle 100, a split ring 110 of the thermoplastic material is used. The ring is opened and placed around the neck of the bottle, preferably above the transfer ring 14. The same sealing technique is used as in FIGS. 1 and 3. That is, after the closure is fastened down onto the container, sonic energy is applied. In this case the sonic energy will melt the ring 110 of sealing material and the closure 20 to form the weld. In so doing, a portion of the ring 110 will also be melted so that it will adhere to the bottle 100.

Figure 8:
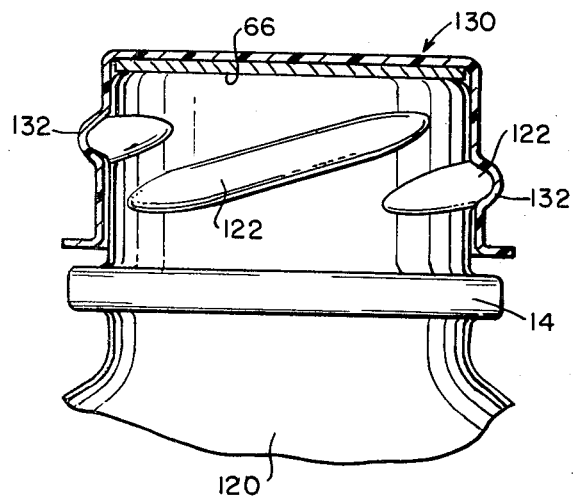

FIG. 8 shows still a further embodiment of the invention, which is a modification of FIG. 2. Here, the container 120 has an interrupted or partial thread 122. The closure 130 has a mating partial thread 132 and a liner 66. As described with respect to FIG. 3, a force 67 is applied downwardly to the top of the closure to compress the liner against the lip of the container to form the seal. The use of the partial threads 122 and 132, as well as the natural resiliency and deformability of the closure 130, permits it to be pushed down sufficiently so that the desired amount of compression of the liner 66 can be obtained. The sonic seal is then made, preferably between the closure thread 132 and the container thread 122. After the seal is broken, by turning the closure, the closure can again be resealed by the threads 122 and 132.

The initial downward compression of the closure, liner 66 obtained in the embodiment of FIG. 8 before sonic sealing, would be difficult to achieve if a full thread is used for the closure, as in FIG. 1. However, a liner such as 66 can be used with the closures of all of the embodiments of the invention with or without initial compression before the sonic sealing energy is applied.

What is claimed is:

1. In combination a container having a neck portion with a sealing lip at the upper end thereof defining an opening, said neck portion including thermoplastic material on a portion thereof other than the sealing lip, a closure of relatively thin walled thermoplastic material having a top wall and a skirt wall depending therefrom, said top wall being adapted to cover said sealing lip for sealing the container opening and said skirt wall fitting over said container neck, mating mechanical fastening means on said closure skirt wall and said container neck for holding the closure to the container and at least one weld formed by sonic energy between the skirt wall of the closure and the thermoplastic material of the container neck portion at a location other than the container sealing lip for also holding the closure to the container.

2. The combination of claim 1 wherein said container neck portion has a raised ring which includes said plastic material, said closure skirt wall having a portion which overlies at least a portion of said ring, the weld being located where the closure wall overlies the ring.

3. The combination of claim 1 wherein there are a plurality of welds located around the closure.

4. The combination of claim 1 wherein the closure has a tab extending from the skirt wall thereof, said tab overlying the thermoplastic material on the neck portion of the container, said weld being located on the tab.

5. The combination of claim 4 wherein the skirt wall of the closure has a weakened portion at said tab above the weld so that upon removal of the closure the tab will break from the closure wall at the weakened portion.

6. The combination of claim 1 wherein the lower portion of the closure skirt wall is formed with a series of cutouts there around, the weld being located on a part of the skirt wall between two of said cutouts, the lower portion of the closure skirt wall being held to the container neck by the weld and breaking away from the remainder of the skirt wall when the closure is removed from the container.

7. The combination of claim 1 wherein the container is of a non-plastic material and the thermoplastic material on the neck portion thereof is separately placed on said portion.

8. The combination of claim 7 wherein the thermoplastic material on the neck portion of said container comprises a ring of said material which is placed on said container neck portion and is attached thereto when the sonic weld is made.

9. The combination of claim 1 further comprising a liner with said closure adjacent the top wall thereof, said liner held in compression between the sealing lip of the neck portion of said container and the closure top wall by the sonic weld.

10. The combination of claim 9 wherein said mating mechanical fastening means comprises at least partial threads formed on the container neck portion and the closure skirt wall.

11. The combination of claim 1 wherein said mating mechanical fastening means comprises at least partial threads formed on the container neck portion and the closure skirt wall.

12. In combination a container having a first portion defining an opening, said first portion including thermoplastic material, a closure of relatively thin walled thermoplastic material having a top wall and a skirt wall depending therefrom sealed on said first portion for sealing the container opening, said container first portion having a screw thread thereon and said closure also formed with a screw thread to mate with the container screw thread, and at least one weld formed by sonic energy between the closure and the thermoplastic material of the container first portion in the area where the screw threads of the closure and container mate for holding the closure to the container.

13. The combination of claim 12 further comprising a liner between the top wall of the closure and the sealing lip of said container.

14. The combination of claim 12 wherein the screw threads on the closure and the container are continuous.

15. The combination of claim 12 wherein the screw threads on the closure and the container are interrupted.

16. The method of sealing a closure of thermoplastic material having a top wall and a depending skirt wall having mechanical fastening means thereon to a container including a neck portion having mechanical fastening means to mate with the fastening means on the closure wall and thermoplastic material thereon, said neck portion including a sealing lip at the upper end thereof defining an opening comprising the steps of fastening said closure to said neck portion of said container by said mating mechanical fastening means in a sealing relationship with the top wall thereof lying over the opening in the container neck and the skirt wall thereof lying over the container neck portion, and applying sonic energy to said closure at a point on the skirt wall thereof which is spaced from the container sealing lip where there is an interface between the closure and the thermoplastic material of the container first portion to produce a weld.

* * * * *